(No Model.)
G. H. HOLLIDGE.
PIE PLATE LIFTER OR CULINARY UTENSIL.
No. 346,287. Patented July 27, 1886.
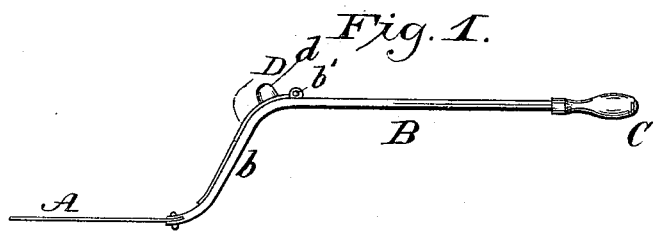
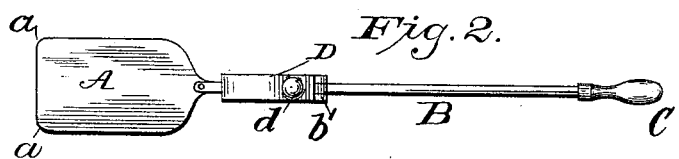
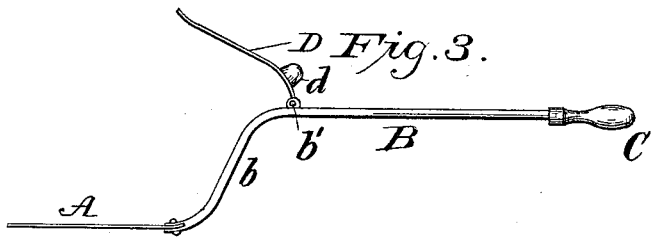
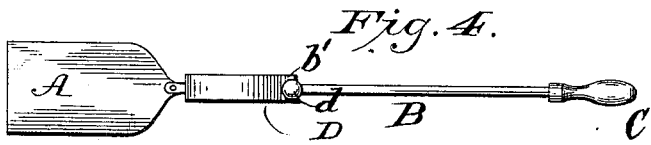
Witnesses:
Frank M. Burnham,
P. J. Lancaster.
Inventor:
G. H. Hollidge,
by Wm. F. Peyton,
his Att'y.

UNITED STATES PATENT OFFICE.

GEORGE H. HOLLIDGE, OF TACOMA, WASHINGTON TERRITORY.

PIE-PLATE LIFTER OR CULINARY UTENSIL.

SPECIFICATION forming part of Letters Patent No. 346,287, dated July 27, 1886.

Application filed March 25, 1886. Serial No. 196,592. (No model.)

*To all whom it may concern:*

Be it known that I, GEORGE H. HOLLIDGE, a citizen of the United States, residing in Tacoma, in the county of Pierce and Territory of Washington, have invented certain new and useful Improvements in Pie-Plate Lifters or Culinary Utensils, of which the following is a specification.

My invention relates to culinary utensils, more especially designed as a combination utensil that is adapted for several purposes in the culinary art, the most prominent of which is its use as a hot-plate lifter, whereby such plates—pie-plates, for example—may be readily removed from the oven or stove without danger of burning the hands of the cook or attendant in charge of the baking operations.

I have especially designed my improved utensil as a pie-plate lifter, while adapting it for various uses in the art of cooking, which will sufficiently appear hereinafter, the object of my said invention being to provide an improved combination utensil fitted especially with the view to its use as a pie-plate lifter, as before set forth.

The subject-matter claimed herein as my invention will be first particularly described below in connection with the accompanying drawings, and will then be distinctly recited in the summary at the close of this specification.

In said drawings, Figure 1 is a side elevation of the utensil, with the holding or thumb plate, which aids in holding the pie-plate when lifted, shown as closed; and Fig. 2 is a top or plan view thereof. Figs. 3 and 4 are similar views to Figs. 1 and 2, respectively, with the holding or thumb plate elevated, as in the act of taking hold of a pie-plate to remove it from the oven.

My improved utensil or implement consists of a flat and comparatively broad blade or plate, A, (with preferably rounded corners $a$, Fig. 2,) forming part of or connected to the front end of a handle, B, the shank of which is bent, as at $b$, to carry the blade or plate A, below the level of the main portion of the handle B of the utensil. The rear end of said handle B is provided with a grasping-surface or handle proper, C, which may be of wood or other non-conductor of heat, if desired. A thumb or holding plate, D, is hinged upon the upper face or side of the shank of the handle B, as at $b'$, and preferably just back of the bent portion $b$ of said shank, and said holding or thumb plate D is curved or bent, so as to conform in shape to the bent portion $b$ of the handle, as clearly shown in the drawings, and so as to fit said bent portion of the handle nicely, preferably, whereby, when not in use as a plate-lifting device the thumb-plate D may lie close to the handle B, and be out of the way when the instrument is to be used for any of the other purposes in the culinary art to which it is adapted. Said thumb-plate is provided with a knob, thumb-piece, or projection, $d$, in advance of the pivotal connection of said thumb-plate with the handle, whereby it may be readily rocked upon its pivot by the thumb of the hand holding the utensil, to lift said thumb-plate when the instrument is being used, and to hold it closed when the plate is being lifted and carried from the oven or stove.

In using my improved utensil as a plate-lifter, the broad flat blade A is inserted under the bottom of the plate, with the thumb-plate elevated, and the thumb-plate is then closed down, so as to bear upon the upper edge of the plate, whereby the plate may be securely grabbed and held between the blade A and the holding or thumb plate D, so as to be readily lifted out of the hot oven or stove, and be carried to the proper place without entailing the necessity for the use of cloths or other protectors to the hands, and without any danger of burning the hands or of dropping the plate, and, furthermore, without disfiguring or interfering with the pie-crust or article which the hot plate may contain. Further than this, my improved implement enables the hot plate to be lifted and carried without inserting the hand and arm into the oven or stove in many cases.

When not used as a plate-lifter, my improved utensil is adapted for many uses in the culinary art. It is, by its broad blade or plate A, adapted as a slicer or cutter, and its edges may be thin for that purpose. It is also designed as a cake-turner and fish-cutter, and to cut or take up various articles of food while hot. It is excellently adapted as a mashed-potato mixer, and to take up from a pot or kettle such articles of food as hot cabbage, for example.

I am aware that combination plate-lifters are not broadly new, and I do not broadly claim such a device; but I have devised an improved implement of this character which is very simple and efficient.

I have sufficiently indicated the uses of my improved implement or utensil, and the construction, as well as the scope of my invention thereof, and, without further elaboration, I state my claim herein to be as follows, to wit:

The culinary utensil or implement hereinbefore described, consisting of the combination, with a handle fitted at its front end with a blade or plate, of a holding-plate pivoted to said handle in rear of its blade or plate, and fitted on its upper surface with a thumb-operating knob or projection in advance of the pivotal connection of said holding-plate with said handle, substantially as described.

In testimony whereof I have hereunto subscribed my name this 15th day of March, A. D. 1886.

GEORGE H. HOLLIDGE.

Witnesses:
FRED E. ELDREDGE,
WM. R. HAWKES.